UNITED STATES PATENT OFFICE.

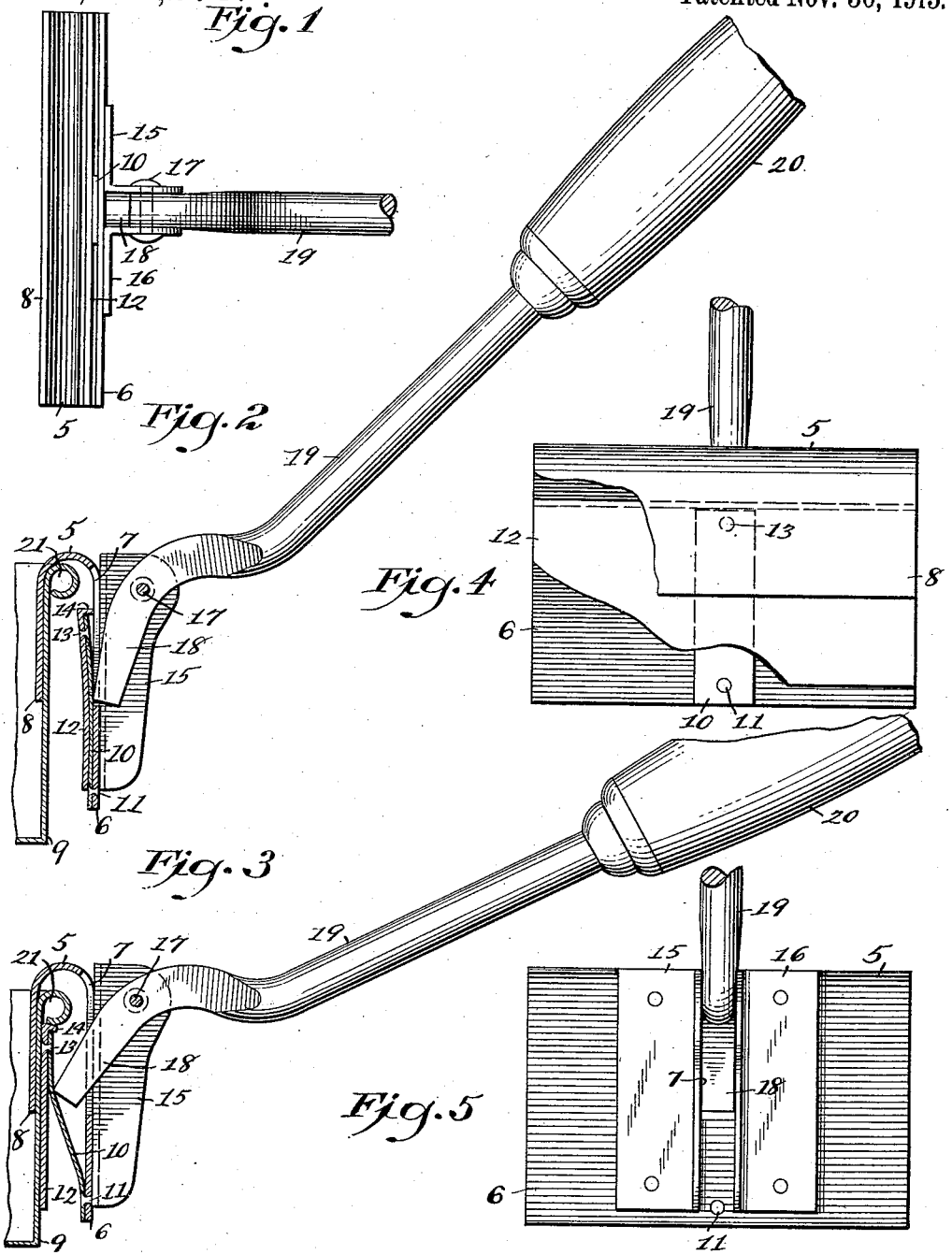

PIERCE H. WILSON, OF TALENT, OREGON, ASSIGNOR OF ONE-HALF TO WARREN HERRING, OF TALENT, OREGON.

PAN-LIFTER.

1,162,273.     Specification of Letters Patent.     Patented Nov. 30, 1915.

Application filed July 15, 1914. Serial No. 851,072.

*To all whom it may concern:*

Be it known that I, PIERCE H. WILSON, a citizen of the United States, and a resident of Talent, in the county of Jackson and State of Oregon, have invented certain new and useful Improvements in Pan-Lifters, of which the following is a specification.

This invention relates to the transportation of cooking, baking, and other utensils from place to place, especially in the event of said utensils being too hot or dirty to be manually handled, and the main object thereof is to provide a device which is adapted for instant engagement and disengagement with utensils of various kinds and classes, whereby the same may be moved from place to place.

My invention is fully described in the following specification, of which the accompanying drawings form a part, in which the separate parts are designated by the same reference characters in each of the views, and in which:—

Figure 1 is a bottom plan view of my invention; Fig. 2 is a side elevation thereof, partly in section, about to be engaged with a pan; Fig. 3 is a similar view, but in pan engagement; Fig. 4 is a front elevation thereof, partly broken away; and Fig. 5 is a rear elevation thereof.

In the drawings forming a part of this application I have shown an inverted U-shaped member 5, the longer member 6 of which is slotted, as shown at 7, and the shorter member of which is designated 8, said members 6 and 8 being spaced apart a distance sufficiently far to admit the upper rim of a pan 9 or any other utensil of a form adapted to be grasped by my invention, and a plate spring 10 is riveted to the lower end of the member 6, as shown at 11, said plate spring 10 having a plate 12 riveted thereto at 13 and shouldered at its top, as shown at 14.

Riveted to the member 6, on the outer face thereof, are two parallel and vertically arranged angle members 15 and 16, between which is pivoted, at 17, a segmental bar 18 having a rod 19 integral therewith, in turn connected with a handle 20 of wood or other material not conductive of heat, and the spring plate 10 normally bears against the member 6 and thus maintains the plate 12 in alinement with said member 6 when the device is not in use.

In practice, the member 8 is passed into a pan or other utensil to be moved, and the member 6 on the outer side thereof, as clearly shown in Fig. 2, this relationship of all of the parts of my device being maintained by means of the spring plate 10 under normal conditions, after which the handle 20 is depressed to force the plate 12 against the outer surface of the pan, against the action of the spring 10, as clearly shown in Fig. 3, and the pan may be raised and carried to any desired point, the shoulder 14 of the plate 12 impinging against the under side of the bead or rim 21 of the pan 9, whereby said pan cannot slip from the device, even though greasy, and, when the pan is again deposited upon a desired support and the handle 20 raised, the parts resume the normal positions shown in Fig. 2 and the device may be removed from the pan, this engagement and disengagement requiring but one hand of a person, that grasping the handle 20.

It will thus be seen that I provide a very simple, efficient, and inexpensive device for the purpose stated, and adapted for instant and positive engagement with a pan or the like and, while I have shown a present preferred form of construction, it will be obvious that I may make changes therein, within the scope of the following claim, without departing from the spirit of my invention or sacrificing its advantages.

Having fully described my invention, what I claim as new, and desire to secure by Letters Patent, is:—

A device of the class described, comprising an inverted U-shaped member, adapted to straddle the side of a pan, a spring plate secured to the inner side of the free end of the outer arm of said member, a plate secured to the free end of said spring plate within the bend of said member, two angle members secured to the outer side of said outer arm, and a handle pivoted within said angle members and having an angular extension bearing on said spring plate, said outer arm being slotted to permit the passage of said extension and said spring plate and connected plate normally resting in parallelism with said outer arm, depression of said handle forcing said plate into contact with the side of a pan to grip the same between said plate and the inner arm of said member.

In testimony whereof I have signed my name to this specification in the presence of the subscribing witnesses.

PIERCE H. WILSON.

Witnesses:
J. C. MASON,
JONAS SPITZER.

Copies of this patent may be obtained for five cents each, by addressing the "Commissioner of Patents, Washington, D. C."